United States Patent [19]

Wernick et al.

[11] Patent Number: 5,323,007

[45] Date of Patent: Jun. 21, 1994

[54] METHOD OF RECOVERING TOMOGRAPHIC SIGNAL ELEMENTS IN A PROJECTION PROFILE OR IMAGE BY SOLVING LINEAR EQUATIONS

[75] Inventors: Miles N. Wernick, Chicago; Chin-Tu Chen, Lisle, both of Ill.

[73] Assignee: Univ. of Chicago Development Corp. Argonne National Laboratories, Chicago, Ill.

[21] Appl. No.: 832,863

[22] Filed: Feb. 7, 1992

[51] Int. Cl.$^5$ ............................................. G01T 1/164
[52] U.S. Cl. ......................... 250/363.03; 364/413.15; 378/4; 250/363.07
[58] Field of Search ...................... 250/363.02, 363.03, 250/363.07, 483.1, 366, 367; 378/62, 4, 901; 364/413.15, 413.19

[56] References Cited

U.S. PATENT DOCUMENTS

| | | | |
|---|---|---|---|
| 4,144,569 | 3/1979 | Wagner | 364/414 |
| 4,891,829 | 1/1990 | Deckman et al. | 378/4 |
| 4,980,552 | 12/1990 | Cho et al. | 250/363.03 |
| 5,003,474 | 3/1991 | Yamashita et al. | 250/363.03 |
| 5,027,817 | 7/1991 | John | 250/363.03 |
| 5,151,599 | 9/1992 | Monnet et al. | 250/363.03 |
| 5,210,421 | 5/1993 | Gullberg et al. | 250/363.04 |

OTHER PUBLICATIONS

Kudo et al., "Sinogram recovery with the method of convex projections for limited-date reconstruction in computer tomography", *Journal of the Optical Society of Amerca A*, vol. 8, No. 7, Jul. 1991, pp. 1148-1160.

Stark et al., "High-resolution image recovery from image-plane arrays, using convex projections", *Journal of the Optical Society of America A*, vol. 6, No. 11, Nov. 1989, pp. 1715-1726.

Oskoui-Fard et al., "Tomographic Image Reconstruction Using the Theory of Convex Projections", *IEEE Transactions on Medical Imaging*, vol. 7, No. Mar. 1988, pp. 45-58.

Youla et al., "Image Restoration by the Method of Convex Projections: Part 1-Theory", *IEEE Transactions on Medical Imaging*, vol. M1-1, No. 2, Oct. 1982, pp. 81-94.

Sezan et al., "Image Restoration by the Method of Convex Projections: Part 2-Applications and Numerical Results", *IEEE Transactions on Medical Imaging*, vol. M1-1, No. 2, Oct. 1982, pp. 95-101.

Brooks et al., "Sampling Requirements and Detector Motion For Positron Emission Tomography", *IEEE Transactions on Nuclear Science*, vol. NS-26, No. 2, Apr. 1979, pp. 2760-2763.

Shepp et al., "Maximum Likelihood Reconstruction for Emission Tomography", *IEEE Transactions on Medical Imaging*, vol. M1-1, No. 2, Oct. 1982, pp. 113-122.

Chen et al., "Bayesian Image Reconstruction Positron Emission Tomography", *IEEE Transactions on Nuclear Science*, vol. 37, No. 2, Apr. 1990, pp. 636-641.

Geman et al., "Stochastic Relaxation, Gibbs Distributions, and the Bayesian Restoration of Images", *IEEE Transactions on Pattern Analysis and Machine Intelligence*, vol. PAMI-6, No. 6, Nov. 1984, pp. 721-741.

(List continued on next page.)

Primary Examiner—Paul M. Dzierzynski
Assistant Examiner—Kim-Kwok Chu
Attorney, Agent, or Firm—Welsh & Katz, Ltd.

[57] ABSTRACT

A method and system for improving signal recovery for tomographic-type detection systems is disclosed which reduces the effect of blurring by obtaining a spatial response function for a plurality of selected detectors and moving the detectors to various positions at various times such that at least two tomographic measurements are taken of substantially the same signal when the object and detection means are at different relative positions. The measurements are then represented as a set of linear equations wherein elements of the response function become weighting factors for corresponding unknown tomographic signal elements. The unknown tomographic signal elements are then estimated by solving the set of linear equations. The tomographic signal elements may then be used as data in projection profiles to generate projection matrices or images directly.

20 Claims, 3 Drawing Sheets

OTHER PUBLICATIONS

Demoment, "Image Reconstruction and Restoration: Overview of Common Estimation Structures and Problems", *IEEE Transactions on Acoustics, Speech, and Signal Processing*, vol. 17, No. 12, Dec. 1989, pp. 2024-2036.

Frieden et al., "Image reconstruction from multiple 1-D scans using filtered localized projection", *Applied Optics*, vol. 26, No. 17, Sep. 1, 1987, pp. 3615-3621.

Ter-Pogossian et al., "PETT VI: A Positron Emission Tomograph Utilizing Cesium Fluoride Scintillation Detectors", *Journal of Computer Assisted Tomography*, vol. 6, No. 1, Feb. 1982, pp. 125-133.

Censor et al., "Strong Underrelaxation in Kaczmarz's Method for Inconsistent Systems", *Numerische* Mathematic ©Springer-Verlag 1983, 41, 83-92 (1983), pp. 83-92.

METHOD OF RECOVERING TOMOGRAPHIC SIGNAL ELEMENTS IN A PROJECTION PROFILE OR IMAGE BY SOLVING LINEAR EQUATIONS

TECHNICAL FIELD OF INVENTION

The invention relates generally to methods for recovering signals, and more particularly pertains to methods for recovering signals in tomographic systems.

BACKGROUND OF THE INVENTION

Typically, tomographic methods such as single photon emission computed tomography (SPECT) and positron emission tomography (PET) rely on measurements of poor quality due to broad spatial response functions imposed by properties of the particular system. In general, tomographic systems are used to infer a spatial distribution or estimate of a spatial distribution of a selected property of an object within the object's interior as determined from measurements of emanations from or through the object. For example, gamma rays emanate from an object in PET systems. Tomographic measuring mechanisms typically use an external source and detector as in the case of CT, or internal induced emanations and external detectors as in the case of PET.

Often times these spatial distributions are represented in picture form for visual analysis. Therefore these spatial distributions are commonly referred to as images although they need not necessarily be pictorially represented (e.g., the values at various points may be analyzed by computer to determine biological parameters or other object properties).

When a pictorial representation is displayed, the effect of broad spatial response functions manifests as a visual blurring. When, instead, the spatial distribution of interest is used to form estimates of some biological parameter, the effect causes a kind of numerical inaccuracy known as a partial volume effect.

PET as a biomedical imaging modality, is unique in its ability to provide quantitative information regarding biological function in a living subject. PET is a technique in which the distribution of a radioactive tracer material, introduced into an object, is reconstructed from the gamma rays that are emitted from within the object as a result of decay. PET is a powerful tool for brain research since, through proper selection of tracer materials, it provides non-invasive measurements of brain function through variables such as metabolism and blood flow. PET is also effective in assessing perfusion and tissue viability and, therefore, is widely used in cardiology and oncology.

Unfortunately, its use has been hampered by the poor spatial resolution of the images produced, resulting primarily from the relatively large detectors used to acquire the tomographic measurements. The poor image quality obtained by PET results from a number of factors, the most serious of which are blur due to broad spatial response functions and quantum noise due to detector response characteristics and limitations on permissible radiation dose.

In PET, each radioactive decay event, taking place within the object, leads to the simultaneous emission of two gamma rays in nearly opposite directions. These gamma rays are then counted by a detector system typically including one or more circular rings comprising a plurality of adjacent detectors positioned about the object. The detectors are connected to electronic coincidence circuitry.

An event is assumed to have taken place when two detectors register gamma rays at approximately the same instant of time. Since it is known that the gamma rays travel at 180 degree angles from one another, simultaneous detection serves to provide information regarding the location of the parent event.

FIG. 1 generally illustrates such a PET detection system. The ring of detectors 10 surrounds the object 12. A series of adjacently positioned detectors 14 form the ring 10. A pair of detectors 14a and 14b form a region known as a detector tube 16. With this configuration, an emission event taking place outside of the detector tube 16 cannot generally produce a pair of gamma rays that strike both detectors 14a and 14b. If a point source of emitting materials were placed at point 18 and moved to the right along line 20, the probability of the detection, by detectors 14a and 14b, of one of its emissions would increase as the source approached the center 22 of the detector tube 16 and then decrease as the source proceeded toward the edge of region and beyond.

The probability density function for the detections along such a lateral cross section of the detector tube 16 generally resembles curve 24. Curve 26 represents the probability function for an adjacent tube. The set of probability values, obtainable in this manner throughout the active region of a detector pair, is described herein as a spatial response function. Ideally, the spatial response function should have a value of zero for points outside of the boundaries of the detector tube; in practice, crosstalk between adjacent detectors precludes this.

The effect of a spatial response function is to determine in what proportion the source distribution of the object contributes on average to the number of gamma rays counted by the corresponding detector pair during the measurement process. Mathematically, if the object source distribution and a spatial response function are represented discretely, then, assuming corrections have been made for effects such as attenuation, the average number of gamma ray emissions detected by the corresponding detector pair can be described approximately as a sum of the density of tracer material within discrete elements of the object, weighted by the value of the corresponding spatial response function at that point. Symbolically, the operation can be represented generally by $$\sum_{m=1}^{M} x_m h_m = d \tag{1}$$

where the $x_m$ denote the values for the object elements, the $h_m$ represent the corresponding elements of the spatial response function, and d is the average number of gamma ray emissions detected within the integration time of the measurement.

While the physical considerations from which this relationship arises are unique to PET, it is recognized in the art that tomographic measurement system can generally be represented as linear systems. Therefore, the term spatial response function will refer to those linear weighting factors relevant to a selected tomographic application. Since, for computational purposes, it is generally necessary to use discrete representations of continuous functions, spatial response function will refer, herein, to a vector of values that will be described as spatial response function elements.

Since the spatial response functions need not necessarily act mathematically on the object elements, and since the object property being measured varies with the particular application, the term signal will be used to refer generally to the true value of the quantity, of interest in a given situation, which is subject to linear transformation by the spatial response function or functions. For computational purposes, the signal will be considered to be divided into discrete values described herein as tomographic signal elements.

In applications other than PET, the observable quantity will not typically be a count of gamma ray emissions. Therefore, the term tomographic measurement will be used to describe the observed quantity, taking the place of d in Equation (1).

Generally, if the spatial response functions limit system spatial resolution, then the sampling rate afforded by the fixed positions of the detectors is typically insufficient to adequately characterize a signal out to the spatial frequency bandwidth determined by the spatial response functions. One solution, commonly employed in PET, moves the detection system to various positions to enable additional samples to be obtained. Using conventional methods, these extra samples in principle allow the signal to be specified accurately up to the bandwidth associated with the detector response functions, but detector response remains the limit on achievable resolution.

Referring again to FIG. 1, when in a conventional PET system there occurs a simultaneous detection of two gamma rays by two detectors at different points in the ring, a decay event is assumed to have taken place somewhere along a line 28 connecting the centers of the two detectors 14a and 14b. The mathematical foundation for traditional tomographic reconstruction techniques assumes the available measurements to consist of integrals of some object property along idealized rays of infinitesimal width, known as projection lines. In the conventional method for reconstructing PET images, the lines connecting the centers of the detectors take the place of these idealized projection lines. This is a very poor approximation which contributes to the low quality of conventional PET images. In reality, because actual detectors have finite extent, the simultaneous detection of two gamma rays proves that a decay event has taken place, not along an idealized ray, but within a broad region defined by the corresponding spatial response function.

Motion has been incorporated in many PET systems to improve sampling. One type of motion is commonly known as wobble. Wobble refers to an in-plane orbital motion of the entire detection system without rotation.

Referring to FIG. 2, when viewed edge-on, the circular wobbling 30 of the detector ring 10 manifests as a one-dimensional simple-harmonic motion. Hence, in the context of a single angular view in the parallel-beam geometry, the projection lines 28 (detector tubes) sweep back and forth with a sinusoidal time dependence.

In the usual procedure, the detection system travels in a continuous motion, and gamma rays are counted (measured) throughout. The gamma rays counted during time intervals of equal duration are grouped together and are considered as single observations 32 constituting additional samples of the signal along the direction of the projection profile. The gamma rays detected during a single time interval are usually treated as having been observed, not over a range of positions as is actually the case, but at a single point within that range. It is possible to stop the motion at discrete positions to achieve precisely what is approximated by the continuous motion, however, for practical reasons of mechanical design, continuous motion is more commonly employed.

The traditional approach to processing raw tomographic measurements 32 from such a system is to assign the counts observed during the motion to a plurality of equally spaced points 34 along an axis 36 of a projection profile by traditional interpolation methods such as bilinear interpolation. In tomographic imaging applications, this step, known as rebinning, yields a projection matrix (or sinogram). After rebinning, corrections are made to the projection matrix to compensate for such factors as attenuation and scattering of gamma rays through tissue in the brain, and/or system variations such as variation in detector sensitivity and other necessary corrections.

The corrected projection matrix is then used to reconstruct the image using various techniques known in the art. The rebinning step is complicated by the fact that the measurements (samples) are distributed in a highly non-uniform way due to the ring geometry of the data-acquisition system and the nature of the wobble motion.

The bilinear interpolation method typically begins with computation of the radial position and angular orientation of each projection line 28. The gamma-ray counts attributed, in the conventional processing approach, to a particular idealized projection line 38 are divided between two grid points 40 and 42 along the axis of the projection profile 36. The two grid points 40 and 42 neighbor an actual coordinate 44 corresponding to the particular idealized projection line 38. The division of the counts is made in proportion to the relative distances of the grid points 40 and 42 to the actual coordinate 44. For example, if the neighboring grid points 40 and 42 are separated by a distance $\Delta r$, and if the actual coordinate 44 lines at a distance s from A, then the fraction $s/\Delta r$ of the counts associated with the true coordinate is assigned to point B and the remaining fraction is assigned to point A.

A blurring problem occurs using this approach since regardless of the number of samples obtained by the moving detection system, the spatial resolution of the signal cannot be improved beyond the limit imposed by the spatial response functions. Such conventional processing techniques used in the practice of PET and other tomography systems typically fail to take into account the broad spatial response functions that degrade the signal. Instead conventional processing techniques assume idealized projection lines and assume infinitesimal detector elements.

Non-moving tomographic systems are known that have improved imaging over conventional moving systems but typically must use a large number of smaller and more expensive detectors to acquire an image. Such non-moving systems that use interpolation methods generally suffer from the same effects of blurring as do conventional moving systems. Also, improving existing moving systems by incorporating the smaller detectors is generally cost prohibitive given the high cost of smaller detectors and the cost of modifying existing hardware. There exists a need for a signal recovery method that improves signals and is compatible with designs for moving systems that use less expensive, larger detectors to help eliminate the need for higher cost detectors while improving the quality of the tomographic images.

Therefore, there exists a need for a method of reducing the effect of blur due to spatial response function in tomographic detection systems. Furthermore, there exists a need for a method of recovering signals in tomographic systems that takes into account effects of spatial response functions rather than assuming idealized conditions. A need also exists for an improved signal recovery method which substantially reduces the computational time for recovering tomographics signals.

SUMMARY OF THE INVENTION

These needs and others have been substantially met by the method and system of signal recovery for tomographic detection systems disclosed below. The inventive method recovers additional signal data by obtaining a spatial response function for measurement system wherein the spatial response function consists of weighting values $h_m$ representing elements of the spatial response function.

After spatial response functions are known for the measurement mechanism, the object and the measurement mechanism or components thereof are moved relative to each other to obtain a plurality of tomographic measurements such that at least two tomographic measurements are taken of substantially the same signal when the object and measurement mechanisms are at different relative positions.

After the measurements are obtained, each of the plurality of tomographic measurements is represented, in a linear equation, as a sum of a plurality of unknown tomographic signal elements $x_m$ each multiplied by its corresponding weighting value $h_m$. The unknown tomographic signal elements $x_m$ are recovered by solving these linear equations and are used as elements in projection profiles for use in generating projection matrices to reconstruct an image of the object. The preferred embodiment uses the method of projections onto convex sets (POCS) to solve the linear equations to recover the tomographic signal elements. The disclosed system uses a computer coupled to a tomographic detection system to control the motion and carry out the steps as described above.

Another embodiment employs relative axial motion using the aforedecribed steps to provide improved resolution of slices in the axial direction. Yet another embodiment allows the unknown tomographic signal elements to be defined as image data thereby bypassing the step of generating of projection matrices.

DESCRIPTION OF THE PREFERRED EMBODIMENTS

Figure 1:
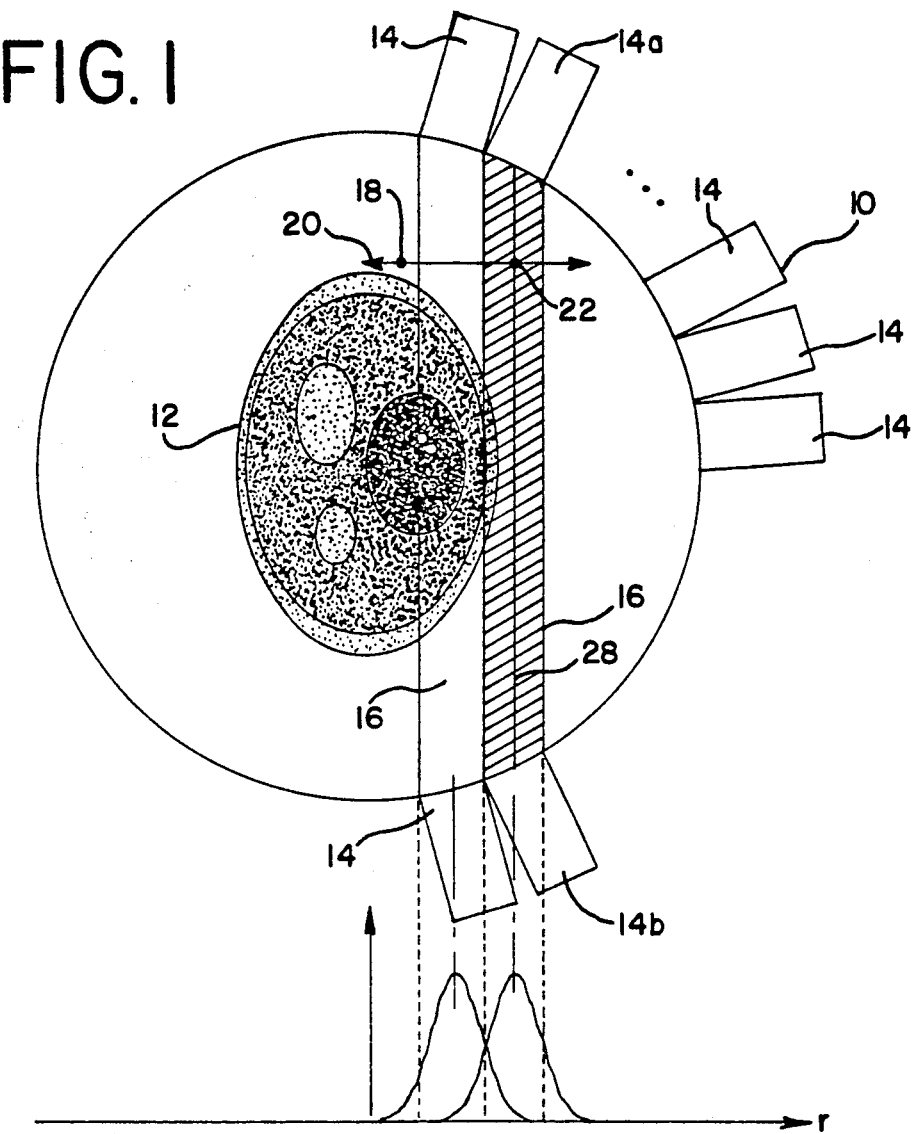
FIG. 1 is a diagrammatical representation generally depicting an object surrounded by a ring of detectors in a PET system.
Figure 2:
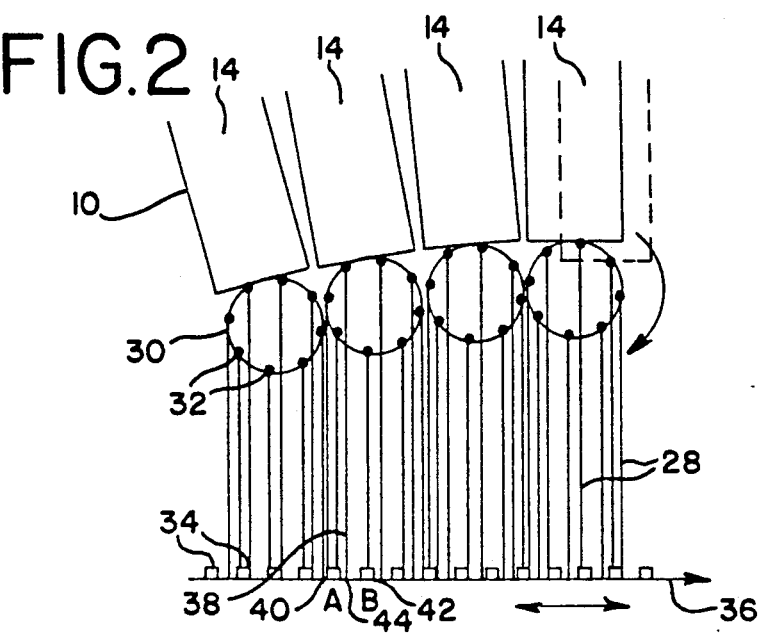
FIG. 2 is a diagram generally depicting a portion of the PET system of FIG. 1 showing the motion of representative idealized parallel projection lines when wobble is introduced.

The preferred embodiment of the inventive method will be described with reference to improving PET images in a system using a wobbling detector ring. It will be recognized that not all tomographic imaging modalities employ a detector ring, and the principle of recovering the projection matrix using detector motion information is not restricted to the ring geometry; however, the circular ring provides a useful framework for considering detector motion in tomography.

The purpose of detector motion in the inventive method is to aid the signal recovery process by introducing additional measurement points in the radial (lateral), angular, or axial directions. The inventive method makes use of the fact that each measurement can be represented as a linear equation and that extra equations representing these additional data may contain additional signal information normally ignored by previous methods.

For the purpose of the preferred embodiment it has been realized that a valuable simplification can be made in cases in which the lateral cross-sections of the spatial response function, determined by a pair of detectors, are approximately the same at various points along the length of the detector tube occupied by the object. In this context, a lateral cross-section refers to the values along the line perpendicular to a selected detector tube. Where the simplification can be appropriately made, the system can be regarded as linear with respect to the projection profile elements. Thus, the complexity of the problem si greatly reduced and a substantial saving in computation time results.

With reference to the preferred embodiment, the term spatial response function will refer to the simplified spatial response function since its elements mathematically takes the place of the quantity $h_m$ in Equation (1). Also in the preferred embodiment, the elements of the projection profile, corresponding to the angular view determined by a set of parallel detector tubes, take the place of the signal elements $x_m$ as defined previously in conjunction with Equation (1). For purposes of explanation, the equations expressing the tomographic measurements are framed and solved in the projection space therefore discussion will be with reference to the conventional rebinning process as characteristic in systems using interpolation. It will be shown that the inventive method offers advantages over the rebinning process and may be used instead of the rebinning process.

In the case of the continuous-motion wobble technique, assuming the measurements are made over successive time intervals of duration $\Delta t$, and the first measurement begins at time $t=0$, then the average value $d_{v,k}^{(j)}$ of the observation or projection measurement made during the jth time interval, by the kth detector tube for angular view v, can be approximated by $$d_{v,k}^{(j)} = \int_{j\Delta t}^{(j+1)\Delta t} dt \int_{-\infty}^{\infty} dr' p_v(r') a_{v,k}[r' - r_{v,k}(t)] \qquad (2)$$

with $j=0, 1, \ldots, J-1$; $k=0, 1, \ldots, K-1$; and $v=0, 1, \ldots, V-1$. Equation (1) makes use of the aforedescribed simplification. In Equation (1), $p_v(r)$ denotes the true projection profile for view v, $a_{v,k}(r)$ is the continuous version of the spatial response function imposed by detector tube k, and $r_{v,k}(t)$ represents the coordinate along the projection profile of the center of detector tube k at time t, given by $$r_{v,k}(t) = A \sin[\omega t + v\Phi_d] + r_{v,k}(0) + \hat{r}_{v,k}(0) \qquad (3)$$

Equation (3) is of the standard form for simple-harmonic motion, in which A denotes the amplitude of the wobble motion, $\omega$ is the angular frequency, $\Phi_d$ denotes the center-to-center angular separation of the detector elements, $\hat{r}_{v,k}(0)$ is the initial position of the center line of detector tube k in view v, and $r_{v,k}(0)$ represents the radial position of the center line of detector tube k within the ring frame of reference, given by $$r_{v,k}^{(0)} = \begin{cases} R\cos[(k + 1/2)\phi_d] & ; v \text{ even} \\ R\cos(k\phi_d) & ; v \text{ odd} \end{cases} \qquad (4)$$

where R represents the radius of the detector ring.

Substituting Equations (3) and (4) into Equation (2), and rearranging terms, the integrated measurement can be written as $$d_{v,k}^{(j)} = \int_{-\infty}^{\infty} dr p_v(r) b_{v,k}^{(j)}(r) \qquad (5)$$

where $b_{v,k}^{(j)}(r)$ is given by $$b_{v,k}^{(j)}(r) = \int_{j\Delta t}^{(j+1)\Delta t} dt a_{v,k}^{(j)}(r - A\sin[\omega t + v\phi_d] = r_{v,k}^{(0)} - \hat{r}_{v,k}^{(0)}) \qquad (6)$$

For the purpose of computation, Equation (5) can be written in a discrete representation as $$d_{v,k}^{(j)} = \sum_{m=1}^{M} [p_v]_m [b_{v,k}^{(j)}]_m \qquad (7)$$

which is simply the inner product between the true projection profile, represented by a vector $p_v$ and an effective spatial response function, denoted by $b_{v,k}^{(j)}$. The result of the measurement made by each detector pair during one time interval provides an equation which can be viewed as imposing a linear constraint on the elements of the projection matrix. If, as the detectors move, K measurements of each projection profile are made during each of J time intervals, then KJ equations are provided by the system. As a result, at most KJ sample points along the axis of the projection space (see FIG. 3) can be accurately characterized, and these can be solved by a variety of mathematical algorithms.

Although, there are a number of ways of solving the equations that describe the measurement process for moving detectors, the preferred method is the method of projections onto convex sets (POCS). This is an iterative technique for finding a point in the intersection of a set of convex constraints. POCS is a useful technique since it permits incorporation of prior knowledge about the signal being measured, and because the complexity of its implementation is independent of the dimension of the problem.

POCS provides a means for finding a point in the feasible set determined by a collection of convex constraints. Suppose, for example, that an unknown discrete signal x is known to obey a set of n constraints, some of which arise from measurements of the signal and some of which are known a priori. Suppose also that the ith constraint confines the signal to belong to a closed convex set $C_i$ in signal space. If that is the case, then the true signal must belong to the set corresponding to the intersection of all the constraints, i.e., $x \in \cap_{i=1}^{n} C_i$.

POCS is an iterative method in which each iteration consists of sequentially projecting the current estimate onto all of the sets describing the convex constraints. In this context, the term projection is used in the linear algebra sense and should not be confused with tomographic projections.

For POCS it is known that, beginning with an arbitrary starting point, an iterative procedure consisting of repeated, successive projection onto all of the constraint sets converges to a point in the intersection, provided that the intersection is non-empty. Symbolically, iteration $(\gamma + 1)$ in this procedure can be written as $$\hat{x}^{(\gamma+1)} = P_n P_{n-1} \ldots P_2 P_1 \hat{x}^{(\gamma)} \qquad (8)$$

where $P_i$ denotes the projection operator for set $C_i$. The sequence described by Equation (8) is known to converge to a point in the intersection of the convex constraints, provided that the intersection is not empty.

For many types of constraint, the form for the projection operator is simple and the iterations can be performed quickly. The forms for many projection operators are well known. Two of the most important ones will now be summarized.

If a signal x is measured by a detector with response function represented discretely by h, then the signal is known to lie in the hyperplane defined by $$\sum_{m=1}^{M} x_m h_m = d \qquad (9)$$

where d is the result of the measurement and M is the maximum number of measurements obtained. The projection $y'$ of any vector y onto this hyperplane is given by $$y' = y + (d - <y,h>) \frac{h}{||h||^2} \qquad (10)$$

where $<\cdot,\cdot>$ denotes an inner product and $||\cdot||$ represents the Euclidean norm.

If the signal is known a priori to be non-negative, then it may be useful to introduce this information in the form of a constraint. The components of projection $y'$ of any vector y onto the set of non-negative signals are given by $$y_m' = \begin{cases} y_m & \text{if } y_m \geq 0 \\ 0 & \text{if } y_m < 0 \end{cases} \qquad (11)$$

Figure 3:
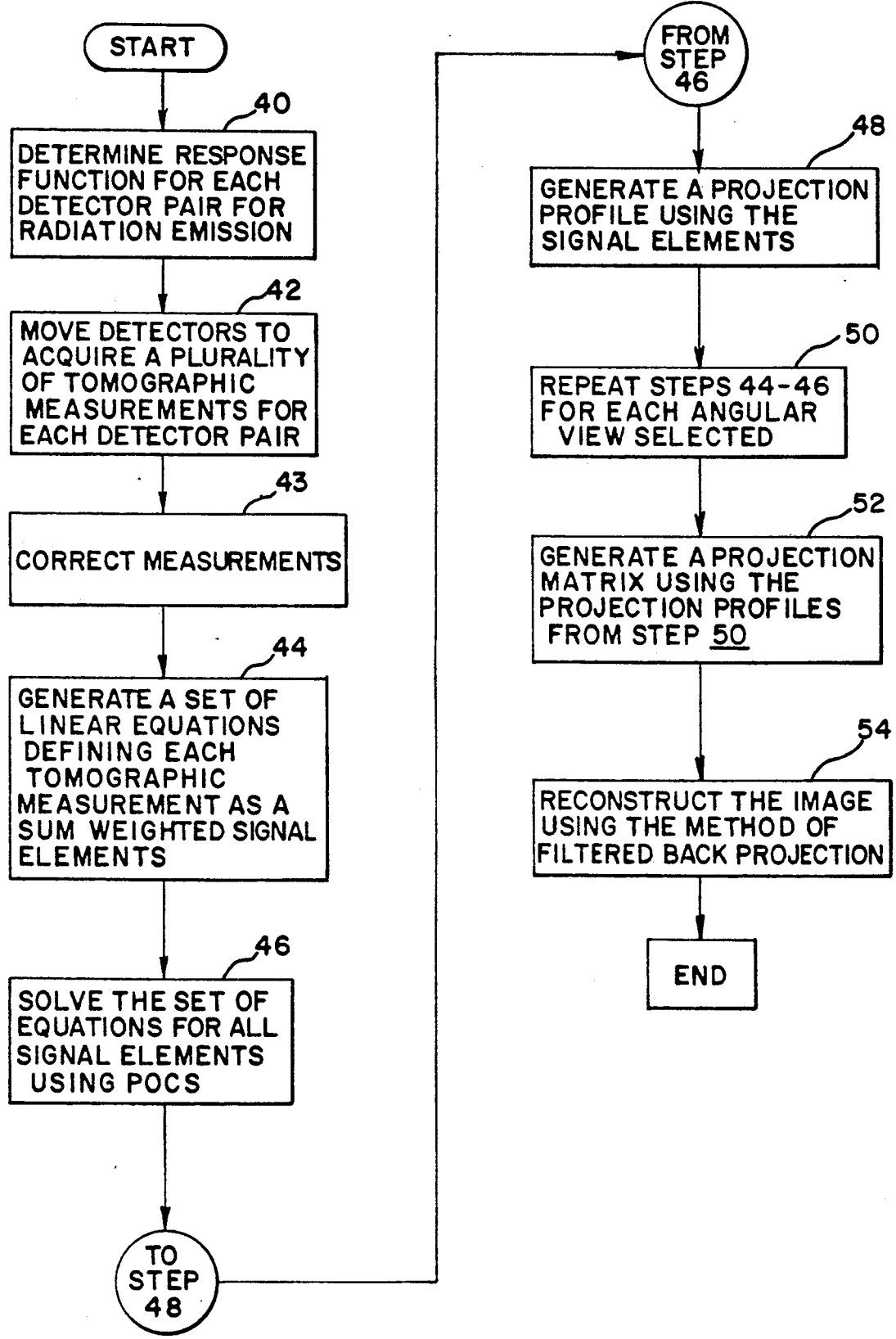
FIG. 3 is a flow chart generally depicting the steps of one embodiment of the inventive method in accordance with the invention as applied to a PET imaging system.

FIG. 3 illustrates one embodiment of the inventive method for signal recovery as applied to a PET system. The first step 40 involves determining the effective spatial response function $b_{v,k}^{(j)}$ for each detector tube in advance of measuring the object. This is a preparatory step, performed in the nature of a system calibration, which need only be done once if the properties of the detection system remain reasonably stable in time.

Methods for determining the spatial response functions of a PET system are known in the art. These methods generally rely on measurements made by placing, within the space normally occupied by the object, a small radioactive source have a known level of activity, in a manner generally resembling that discussed previously in connection with line 20 of FIG. 1. It should be noted that the effective spatial response function $b_{v,k}^{(j)}$ includes the effect of continuous motion during the integration time of the measurements and must, therefore, be determined while the system undergoes its normal mode of motion. Alternatively, $b_{v,k}^{(j)}$ may be determined by measuring $a_{v,k}$, a property of the system at rest, and computing $b_{v,k}^{(j)}$ using a discrete computation of Equation (6).

It may be necessary at the time of putting the detection system into actual practice to update the estimates of the spatial response functions to account for variations in detector performance that may have occurred after the initial determination of the spatial response function (for example, due to aging or failure or components). This can be achieved by using a source, such as an object known in the art as a Phelps phantom, for use as a reference. The reference source may be measured in the same manner as a genuine object. If this is performed at the time that the spatial response functions were initially determined and at the time of actual operation of the detection system, then differences in the strength of the response of the detector tubes may be used to determine correction factors for use in updating the amplitudes of the spatial response functions.

Once the effective spatial response functions $b_{v,k}^{(j)}$ are known, the ring of detectors is moved, step 42, to a plurality of positions, such that each point within the projection profile is repeatedly measured either by different detector pairs or by the same detector pair at different times. To gain additional information for aiding the signal recovery process, it is essential that the new measurements not merely duplicate previous measurements in the sense of forming identical matchings between spatial response function elements and projection matrix elements. Specifically, the relative movement of the components of the measurement system and the object must be done in such a way that the spatial response function elements are altered from one measurement to the next, e.g., $b_{v,k}^{(j)} \neq b_{v,k}^{(j+1)}$. It should be noted, however, that if rigid motion (such as wobble) of the detection system is employed, the spatial response function elements may simply be reorganized within the vector $b_{v,k}^{(j)}$, i.e., what had been, in one measurement, the spatial response function element acting on one point in the projection profile, may act on a different point in the subsequent measurement. It should also be noted that many system designs incorporating motion deliberately duplicate measurements (e.g., in each cycle of the wobble motion) and that a group of such measurements should be considered as a single measurement by adding together all of the results obtained therein.

It is common practice in PET to determine, from additional measurements of the object and of the measurement system, factors which serve to correct for effects such as attenuation. Generally, in conventional methods, these factors are applied to the projection matrix once it has been assembled; in the inventive method, the necessary corrections are made, instead, to the raw tomographic measurements.

In step 43, the raw tomographic measurements are corrected by factors representing information regarding the attenuation properties of the object. Specifically, each raw tomographic measurement should be divided by an estimate of the tomographic projection of the attenuation coefficient of the object along the length of the detector tube having produced the raw tomographic measurement. Methods for determining the required attenuation-correction factors are known in the art and are typically obtained, using normal measurement system, by tomographic transmission measurements made of the object making use of a known source placed external to the object. Ideally, the transmission measurements should be made in such a way that each transmission measurement corresponds exactly to a raw emission measurement. This can be accomplished by using the same motion procedure for all scans required to obtain the necessary correction factors.

In step 44, for each corrected measurement obtained in step 43, a linear equation of the form of Equation (7) is constructed to represent it. A set of equations results, in which the number of equations is equal to the number of measurements, and each equation corresponds to the process by which a single detector pair forms a measurement at each position to which it was moved in step 42. In PET, the quantities $d_{v,k}^{(j)}$ strictly represent the average measurement value that would be obtained in repeated observations. In practice, repeated trials are unavailable and the single observed value is taken to be the best available estimate of this quantity. The random discrepancy resulting from this approximation is considered as a source of noise.

Since the effective spatial response functions $b_{v,k}^{(j)}$ are determined in advance and the measurement values $d_{v,k}^{(j)}$ are obtained by steps 42 and 43, the set of equations constructed in step 44 can be solved yielding estimates of the unknown projection profile elements $[p_v]_m$, representing values at points on the projection profile. The precise locations of these points are a matter of choice, however, uniform spacing is generally preferred to facilitate the later reconstruction step 54.

In step 46, the set of equations are solved by treating them as constraints in the POCS algorithm as previously described. In addition, other constraints known in the art (e.g., non-negativity) can be introduced to improve the performance of the technique.

In PET, the measurement process is subject to extreme amounts of quantum noise due to the relatively small number of gamma rays used to measure the object. Therefore, in PET, and likewise in any tomographic application characterized by noisy measurements, the POCS algorithm is not suitable as conventionally presented. This is the case because the constraint sets represented by the linear equations governing the measurement process will fail to intersect, violating an important condition for the applicability of POCS. However, it is possible, through a technique known as underrelaxation, to modify the POCS algorithm to enable a useful solution to be obtained. In the usual POCS algorithm, a step vector required to project the current estimate onto one of the constraint sets is computed at each step in an iteration. For steps involving the constraints reflecting the measurements, the step vector may then be multiplied by a relaxation parameter $\lambda = 1/(\alpha + \gamma)$, where $\gamma$ is the number of the iteration and $\alpha$ is a parameter determining the rate and strength of the underrelaxation. It will be recognized that precise values for the number of iterations to be performed, and for the parameters $\lambda$ and $\alpha$, are dependent on the application and may be obtained by trial-and-error. The formula for λ need not necessarily take on the precise form detailed above; what is important is that the values of λ be positive, real numbers much less than one, and that in addition it may be necessary to decrease the value of λ as the iterations progress.

Steps 44–46 are then repeated for each desired projection profile (each angular view) as depicted in step 50. It is assumed that the spatial response functions for all detector combinations have been accumulated in advance.

Next, in step 52, the recovered projection profile elements are used to form the rows of an array known in the art as a projection matrix or sinogram. Having mitigated the effect of the spatial response functions, the image may then be reconstructed in step 54 from the assembled projection matrix using a known reconstruction technique such as filtered backprojection.

It will be recognized that although the aforedescribed method moves the detectors to obtain additional signal information, the same result will occur if the object is moved and the detectors remain stationary. Therefore the inventive method requires relative motion i.e., motion between an object from which a desired measurement is sought relative to the corresponding detection mechanism. The inventive method uses motion to retrieve additional signal information normally ignored in conventional systems using interpolation techniques.

The inventive method may be incorporated into a tomographic system such as PETT VI, a positron emission tomography system currently in use at the University of Chicago. Such a system has four rings of radius 28.5 cm, comprising 72 detectors, each having a width of 2.5 cm. The rings undergoes a wobble motion with radius equal to half of a detector width at a rate of 1 rev/sec ($\omega = 2\pi$ rad/sec). Measurements are made throughout the course of the ring motion and are grouped into 16 intervals of equal duration.

Figure 4:
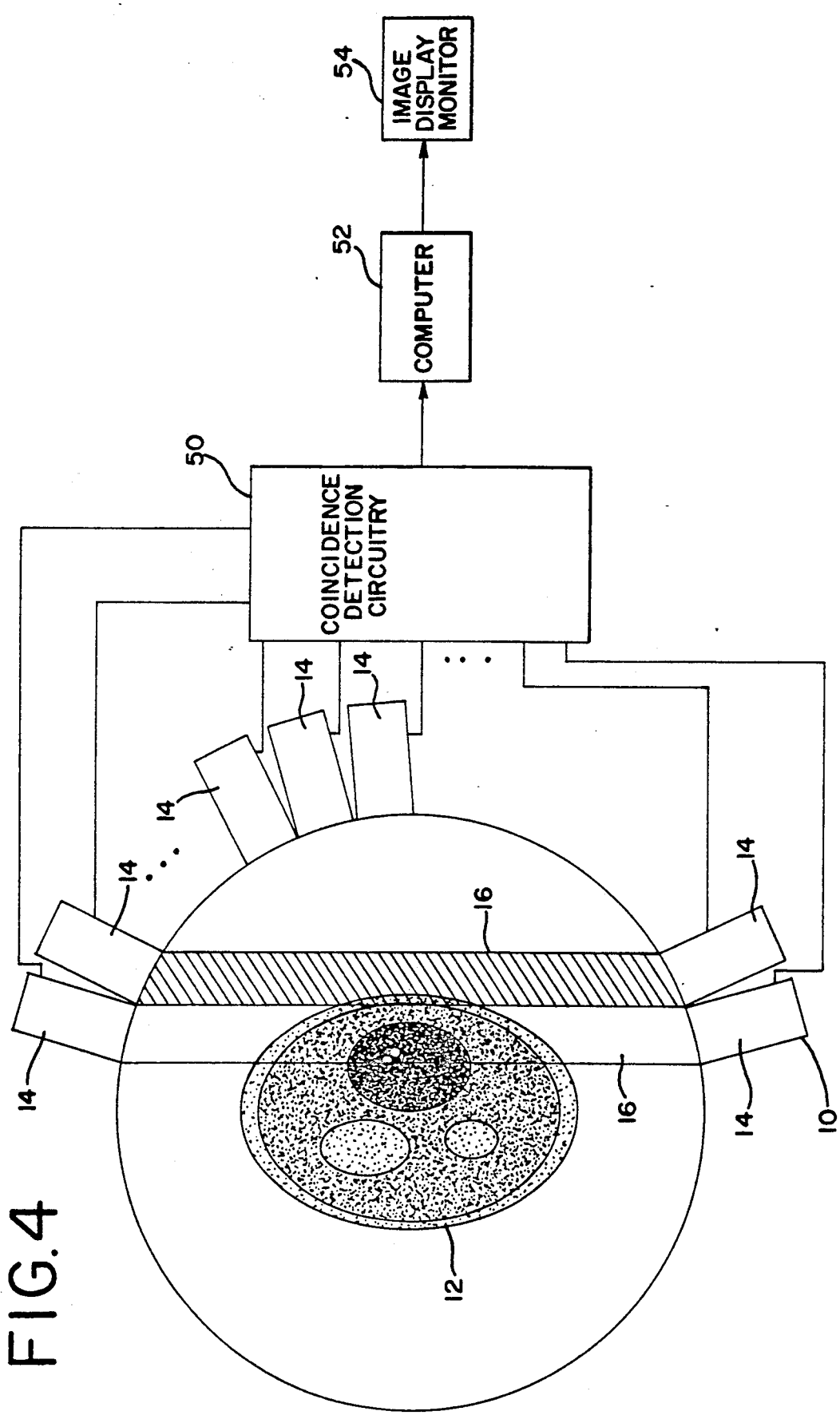
FIG. 4 is a schematic representation generally depicting a PET system designed in accordance with the invention.

The steps depicted in FIG. 4 detail only those steps unique to the inventive method. Though not detailed herein, additional steps normally required to obtain a PET image, such as preparation of the object and corrections for such effects as scatter and "randoms," are assumed to be performed by methods known in the art. One step which may be omitted from the usual processing procedure is correction of the projection matrix to account for non-uniformity of the sampling pattern. This correction is rendered unnecessary in the inventive method since the relevant information is contained within the spatial response functions.

In determining the spatial response function in step 40, certain known phenomena should not be overlooked including the possibility of crosstalk between neighboring detectors, and noise in the data-acquisition process. Where noise is a factor, the underrelaxation modification is important to the success of the inventive method in embodiments in which the method of POCS is used to recover the signal. In applying the inventive method to data simulating the PETT VI device, good results were obtained using the relaxation parameter λ, where α was assigned a value on the order of ten. In cases of high levels of noise, an order of ten iterations ($\gamma = 1, 2, \ldots, 10$) provided good results. Where noise is less predominant, more iterations and small values of α may be appropriate.

The inventive method, as applied in the same computer simulations, permitted recovery of a projection matrix of dimension 256 (projection profile elements) ×72 (angular views) in approximately seven seconds when ten iterations were performed in recovering the elements of each projection profile (each row of the projection matrix). These results were obtained in an implementation using the C programming language on an IBM RS/6000 Model 730 computer.

Applying the method of FIG. 3 to a PET system such as PETT VI involves treating each measurement as one equation of the form of Equation (8). For each profile, on the order of 16 detector tubes provide measurements during 16 time intervals along the wobble motion, resulting in roughly 256 measurements. Ideally, therefore, the available measurements allow for the solution of approximately 256 unknown elements for each projection profile, however, the effect of noise and inaccuracies in the spatial responses function estimates may reduce that number.

Images may then be reconstructed from projection matrices produced by the inventive method using well known filters in the filtered backprojection algorithm. One such filter is a parabolic filter of the form, $$H(f) = \begin{cases} -1.5f(f - f_c) & ; 0 \leq f \leq F_c \\ -1.5f(f + f_c) & ; -f_c \leq f \leq 0 \\ 0 & ; |f| > f_c \end{cases}$$

In Equation (12), $f_c$ is the cutoff frequency of the filter and $f'$ is a normalized frequency coordinate given by $f' = f/f_s$, where $f_s$ is the radial sampling frequency of the projection matrix.

Although the preferred embodiment uses POCS, it will be recognized that any suitable technique may be applied. Also, although "wobble" motion was incorporated in the preferred embodiment, it will be recognized that there are a number of modes of motion that can be used to increase the number of samples in the projection space. These include, for example: (1) rotation of a ring of detectors about its center; (2) a "clamshell" motion in which the ring is hinged at one side and opens at the other; (3) translation of the ring along its axis, and (4) any combination of these such as helical motion which makes use of both angular and axial motion.

FIG. 4 illustrates a PET system having a ring of detectors 10 coupled to coincidence detection circuitry 50. The circuitry 50 is coupled to a computer 52 such the IBM RS/6000 Model 730 mentioned above. The computer 52 is coupled to an image display monitor 54. The coincidence detection circuitry 50 determines when a pair of gamma rays or other signal of interest is detected and generates the tomographic measurement as known in the art. Computer 52 has processing means such as a central processing unit for representing each of the plurality of tomographic measurements as linear equations and for determining the unknown tomographic signal elements $x_m$ by solving the set of linear equations defined by the plurality of tomographic measurements in accordance with the corresponding steps of FIG. 3.

To appreciate another embodiment of the invention, it should be noted that tomographic systems typically view the object in terms of parallel, two-dimensional cross-sections of the object known as slices. The direction perpendicular to these slices is commonly known as the axial direction since it typically lies along the longitudinal axis of the measurement system. With traditional tomographic methods, the three-dimensional nature of the slice is typically ignored and the detectors are assumed to be infinitesimally thin in the axial direction.

Although the preferred embodiment represents an improvement over conventional methods by effectively mitigating the effect of the broad extent of the spatial response functions within the plane of the slice, the method of FIG. 3 does not specifically address the spatial response function along the axial direction. In many applications, particularly in x-ray CT and PET, it may be desirable to take this factor into account.

In an alternative embodiment, motion and signal recovery are used to improve the spatial resolution of the projection data along the axial direction, in effect producing thinner, more well-defined slices which may be extremely valuable where stacking of the slices is used to produce a three-dimensional representation of the object. In particular, such an improvement may prove useful in localizing, along the axial direction, small object features such as tumors. Improved resolution along the axial direction produces, in addition, the somewhat hidden benefit of improved image quality within the slices by eliminating the averaging effect caused by thick slices.

The steps required in the present alternative embodiment are similar in kind to those required in the preferred embodiment; the primary differences lie in the definition of the spatial response functions and in the mode of motion employed. The preferred embodiment is effective in the case in which the lateral cross-sections of the spatial response function within the plane of the slice are approximately equal to one another. Where this is the case, the measurement process may be viewed as linear with respect to the projection profile elements. A simplified spatial response function, that acts on the projection profile, can be defined, comprising values of the cross-section of the full spatial response function along the direction perpendicular to the detector tube, and within the plane of the slice. In this embodiment, the analogous case is assumed for spatial response function cross-sections that, likewise, lie perpendicular to the detector tube, but in contrast, lie perpendicular to the plane of the slice (along the axial direction).

The first step in the process consists of determining the spatial response function for each detector pair in a manner known in the art; analogous to that previously referred to in connection with the preferred embodiment. As in the preferred embodiment, using the simplifying assumption regarding the spatial response function cross-sections, the spatial response function applied to the projections is actually a representation of the roughly equal cross-sections of the full spatial response function that acts on the object distribution.

In the next step, the measurement mechanism undergoes a linear translation along the axial direction, permitting measurements to be obtained at various axial positions. The measurement process during motion is analogous to that described in the preferred embodiment; conceptually, the purpose and goals are the same. For the time being, the axial motion is assumed to be the only motion taking place. In this next step, as in the preferred embodiment, any necessary correction factors, for effects such as attenuation, must be applied to the raw tomographic measurements obtained in the previous step.

Once corrected, the measurement results are then used to form a set of linear equations of the same general form as Equation (7). In the present context, the indices k and v and the measurement $d_{v,k}^{(j)}$, appearing in Equation (7) retain their interpretations as defined with respect to the preferred embodiment. However, the index j will be used to number the measurements resulting from axial motion rather than from wobble. The vector $p_v$ will be interpreted to denote a discrete representation of a projection profile, not as traditionally defined along of an axis within the plane of the slice, but rather along the direction perpendicular to the slices. This vector will be termed an axial projection profile. An axial projection profile is defined for each detector tube wherein the elements of the profile $[p_v]_m$ reflect the ideal values that would be obtained, at various axial positions of the detector tube, if the detector tube were infinitesimally thin in the axial direction. As in the preferred embodiment, the true projection profile is the signal sought to be recovered from the imperfect measurements. The quantity $b_{v,k}^{(j)}$ can, as in the preferred embodiment, be taken to represent an effective spatial response function reflecting integration of the measurements over time in cases where continuous motion is employed.

Having constructed a set of equations, the equations are then solved by any suitable technique, such as the method of POCS as previously described, to obtain values for the axial projection profile elements $[p_v]_m$. The considerations relating to the application of POCS in the preferred embodiment apply equally to the alternative embodiment.

The above steps, with the exception of the initial determination of the spatial response functions, are repeated for each detector tube, yielding one axial projection profile for each detector tube. The results obtained for the axial projection profiles may be used variously. For example, they may be organized into projection matrices as traditionally defined, with the result being that each projection matrix represents information defining a slice located at a particular point along the axial direction. To organize these values into projection matrices, each value may be used in the construction of a different projection matrix corresponding to a slice located at a different axial position. The projection matrices may then be constructed by conventional rebinning techniques or by methods such as that described in the preferred embodiment. Once constructed, the projection matrices may be used to reconstruct slices of the object by known reconstruction methods such as filtered backprojection. Alternatively, the axial projection profile information may be used to construct a three-dimensional analogue of the conventional projection matrix from which an estimate of the three-dimensional object distribution may then be reconstructed by known methods.

While, for convenience, certain of the terms used to describe the alternative embodiment relate specifically to PET, it will be recognized that analogous quantities and measurement system exist in other tomographic methods, such as x-ray CT. The method described herein applies equally well to other such tomographic systems, with slight modifications made in consideration of the specifics of the selected system. Such modifications will be apparent to those skilled in the art.

In another embodiment, motion and signal recovery are used to improve the spatial resolution of the estimates for the elements of the object distribution, particularly in cases where the spatial response function cross-sections may not be regarded as equal as may be the case in SPECT systems. Where such is the case, the tomographic measurements may no longer be considered as linear with respect to the projection profile elements but must be modeled, instead, as linear with respect to the elements of the object distribution of interest.

The steps involved are similar to those shown in FIG. 3. The first step consists of determining the spatial response functions that act in the measurement process on the elements of the object distribution. This can be performed in a manner analogous to that referred to in connection to the preferred embodiment, however it should be noted that the entirety of each spatial response function is required in the alternative embodiment.

In the next step, measurements are made and correction factors are applied in precisely the same manner as previously described. Next, a set of linear equations of the following form is constructed:

$$d_{v,k}^{(j)} = \sum_{m=1}^{M} o_m [b_{v,k}^{(j)}]_m \quad (13)$$

In Equation (13) $o_m$ represent discrete elements of the object distribution, $[b_{v,k}^{(j)}]_m$ denote the elements of the spatial response functions, and the indices are interpreted in generally the same manner as defined with respect to Equation (7).

Once assembled, the equations can be solved by any suitable means, for example, by the method of POCS as previously described, to determine estimates for the elements of the object distribution. Since determination of the object distribution is typically the goal in tomographic applications, this step completes the process.

It will be noted that the above embodiments may also be useful in a variety of other tomographic systems including x-ray computed tomography (CT) systems. Furthermore, the inventive method may find particular use in non-medical activities such as non-destructive testing, and detection of radiation emissions from nuclear storage facilities.

Specific embodiments of novel methods for improving signal recovery in tomographic systems have been described for the purposes of illustrating the manner in which the invention may be used and made. It should be understood that the implementation of other variations and modifications of the invention in its various aspects will be apparent to those skilled in the art, and that the invention is not limited by the specific embodiments described. It is therefore contemplated to cover by the present invention any and all modifications, variations, or equivalents that fall within the true spirit and scope of the basic underlying principles disclosed and claimed herein.

What is claimed is:

1. A method of recovering signals from measurements of emanations from or through an object in a tomographic measurement system, the system having measurement means for measuring the signals, an output from the measurement means being represented as a tomographic measurement, the method comprising the steps of:
   (i) obtaining a spatial response function of the measurement means wherein the spatial response function is comprised of weighting values $h_m$ which represent elements of the spatial response function;
   (ii) moving the object and the measurement means relative to each other to obtain a plurality of tomographic measurements such that at least two tomographic measurements are taken of substantially the same signal when the object and measurement means are at different relative positions;
   (iii) representing each of the plurality of tomographic measurements $d_n$ as a function of the sum of a plurality of unknown tomographic signal elements $x_m$ each multiplied by its corresponding weighting value $h_m$; and
   (iv) determining the plurality of unknown tomographic signal elements $x_m$ by solving a set of equations defined by the plurality of tomographic measurements $d_n$ represented in step (iii).

2. The method of claim 1 wherein the step of obtaining the spatial response function of the measurement means comprises the steps of:
   moving a signal source and the measurement means relative to each other; and
   measuring the response of the measurement means without the object present.

3. The method of claim 1 wherein the plurality of tomographic measurements $d_n$ include measurements for a plurality of projection profiles representing a plurality of selected angular views of the object.

4. The method of claim 3 further comprising the step of:
   generating a plurality of projection profiles using the determined tomographic signal elements from step (iv) as projection data.

5. The method of claim 4 further including the steps of:
   providing axial relative motion between the object and measurement means to obtain measurements at a plurality of different selected axial positions;
   generating the plurality of axial projection profiles for each selected axial position;
   generating a plurality of projection matrices from the projection profiles; and
   generating an image using the generated projection matrices.

6. The method of claim 1 wherein the measurement means includes a plurality of adjacent detectors arranged in a ring configuration substantially surrounding the object.

7. The method of claim 1 wherein the step of obtaining a spatial response function includes the step of obtaining a spatial response function for at least one pair of detectors.

8. The method of claim 1 wherein the function is a linear relationship.

9. The method of claim 8 wherein determining the unknown tomographic signal elements $x_m$ includes the step of solving the set of linear equations using a method of projections onto convex sets (POCS).

10. The method of claim 1 further including the step of:
    generating at least a portion of an image using the determined tomographic signal elements from step (iv) as image data.

11. The method of claim 1 wherein moving the object and measurement means relative to each other includes the step of:
    moving the object in an axial direction with respect to the measurement means.

12. A method of recovering signals from measurements of emanations from or through an object in a tomographic measurement system, the system having measurement means for detecting the signals, an output from the measurement means being represented as a tomographic measurement, the method comprising the steps of:

(i) obtaining a spatial response function of the measurement means wherein the spatial response function is comprised of weighting values $h_m$ which represent elements of the spatial response function;

(ii) moving the object and the measurement means relative to each other to obtain a plurality of tomographic measurements $d_n$ such that at least two tomographic measurements are taken of the same signal when the object and measurement means are at different relative positions;

(iii) representing each of the plurality of tomographic measurements $d_n$ as a function of the sum of a plurality of unknown tomographic signal elements $x_m$ each multiplied by its corresponding weighting value $h_m$;

(iv) determining the plurality of unknown tomographic signal elements $x_m$ by solving a set of equations of the general form represented in step (iii);

(v) generating at least one projection profile using at least some of the tomographic variables $(x_m)$;

(vi) generating an image projection matrix using at least a portion of the projection profile; and (vii) reconstructing the image using at least a portion of the projection matrix.

13. The method of claim 12 wherein the measurement means includes a detector ring of adjacently located detectors as part of a positron emission tomography (PET) system.

14. The method of claim 13 wherein moving the detector ring includes wobbling the ring of detectors such that any detector travels in a radially continuous pattern.

15. The method of claim 12 wherein determining the unknown tomographic signal element $x_m$ includes solving the linear equations using a method of convex projections.

16. A method of recovering signals from measurements of emanations from or through an object in a tomographic measurement system, the system having measurement means for detecting the signals, an output from the measurement means being represented as a tomographic measurement, the method comprising the steps of:

(i) obtaining a spatial response function of the measurement means wherein the spatial response function is comprised of weighting values $h_m$ which represent elements of the spatial response function;

(ii) moving the measurement means about the object wherein moving includes moving a first detector pair in the measurement means to a first position to take a tomographic measurement $d_n$ of the signal, and subsequently moving the first detector pair of another detector pair in the measurement means to a second position to also take a tomographic measurement of substantially the same signal such that the weighting values $h_m$ are altered from one measurement to the next measurement;

(iii) repeating step (ii) for a plurality of measurements corresponding to each of a plurality of predetermined angular views;

(iv) representing each of the plurality of tomographic measurements $d_n$ as function of the sum of a plurality of unknown tomographic signal elements $x_m$ each multiplied by its corresponding weighting value $h_m$;

(v) determining the plurality of unknown tomographic signal elements $x_m$ by solving a set of equations of the general form represented in step (iv) for each of the projection profiles;

(vi) generating a projection profile for the plurality of angular views using the tomographic signal elements $(x_m)$;

(vii) generating an image projection matrix using the plurality of projection profiles; and (viii) reconstructing the image using the projection matrix.

17. The method of claim 16 wherein detector means form a ring of adjacently located detectors as part of a positron emission tomography (PET) system.

18. A tomographic measurement system for recovering signals from measurements of emanations from or through an object and having predetermined spatial response functions for its measurement means wherein each spatial response function is comprised of weighting values $h_m$ which represent elements of each spatial response function, the system comprising;

means for retrieving the weighting values $h_m$ for selected spatial responses;

means for moving the object and the measurement means relative to each other to obtain a plurality of tomographic measurements $d_n$ such that at least two tomographic measurements are taken of substantially the same signal when the object and measurement means are at different relative positions;

means for representing each of the plurality of tomographic measurements $d_n$ as a function of the sum of a plurality of unknown tomographic signal elements $x_m$ each multiplied by its corresponding weighting value $h_m$; and means for determining the plurality of unknown tomographic signal elements $x_m$ by solving a set of linear equations defined by the plurality of tomographic measurements $d_n$.

19. The system of claim 18 wherein means for representing includes computer means capable of generating the linear equations.

20. The system of claim 18 wherein means for determining includes computer means capable of solving the linear equations.

* * * * *

UNITED STATES PATENT AND TRADEMARK OFFICE
CERTIFICATE OF CORRECTION

PATENT NO. : 5,323,007
DATED : June 21, 1994
INVENTOR(S) : Wernick et al.

It is certified that error appears in the above-indentified patent and that said Letters Patent is hereby corrected as shown below:

Column 1, line 2, add the following new first paragraph:
--This invention was made with Government support under the NIH grant/contract # 1 T32 CA09649-01. The Government has certain rights under this invention.--

Signed and Sealed this

Twentieth Day of September, 1994

Attest:

BRUCE LEHMAN

*Attesting Officer*  *Commissioner of Patents and Trademarks*